United States Patent
Katz et al.

(10) Patent No.: US 10,430,739 B2
(45) Date of Patent: Oct. 1, 2019

(54) AUTOMATIC SOLUTION TO A SCHEDULING PROBLEM

(71) Applicant: International Business Machines Corporation, Armink, NY (US)

(72) Inventors: Michael Katz, Nahariya (IL); Vladimir Lipets, Haifa (IL); Michael Masin, Haifa (IL); Dany Moshkovich, Yokneam Ilit (IL); Segev E Wasserkrug, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 15/006,133

(22) Filed: Jan. 26, 2016

(65) Prior Publication Data

US 2017/0213181 A1  Jul. 27, 2017

(51) Int. Cl.
| | |
|---|---|
| *G06F 9/48* | (2006.01) |
| *G06Q 10/06* | (2012.01) |
| *G06N 5/00* | (2006.01) |
| *G06F 9/455* | (2018.01) |
| *G05B 19/418* | (2006.01) |

(52) U.S. Cl.
CPC ..... *G06Q 10/063116* (2013.01); *G06F 9/455* (2013.01); *G06F 9/4881* (2013.01); *G06N 5/003* (2013.01); *G06Q 10/063114* (2013.01); *G05B 19/41865* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 5,946,375 | A * | 8/1999 | Pattison | G07C 1/10 379/111 |
| 6,263,358 | B1 * | 7/2001 | Lee | G06F 8/458 718/100 |
| 7,406,475 | B2 | 7/2008 | Dorne et al. | |
| 7,885,857 | B1 * | 2/2011 | Fukuya | G06Q 10/06 705/26.5 |

(Continued)

OTHER PUBLICATIONS

Christiane Barz and Rainer Kolisch., "Hierarchical Multi-skill Resource Assignment in the Telecommunications Industry", Article first published online: Jul. 15, 2013, Production and Operations Management, vol. 23, Issue 3, pp. 489-503, Mar. 2014.

*Primary Examiner* — Gurkanwaljit Singh
(74) *Attorney, Agent, or Firm* — Barry Blount

(57) ABSTRACT

A method comprising obtaining a scheduling problem comprising: a set of agents and a set of tasks to be performed by the set of agents, wherein solving the scheduling problem using an automated solver is not feasible using available predetermined resources. The method comprises automatically generating a plurality of alternative scheduling problems, wherein a solution to each such alternative scheduling problem defines a solution to the scheduling problem and determining a solution to the scheduling problem by applying the automated solver to solve, while using the available predetermined resources, an alternative problem of the plurality of alternative scheduling problems to determine a solution to the alternative problem and by mapping the solution to the alternative problem to the scheduling problem, whereby determining the solution.

13 Claims, 3 Drawing Sheets

(56) References Cited

U.S. PATENT DOCUMENTS

| | | | |
|---|---|---|---|
| 8,463,638 B2 | 6/2013 | Hamilton et al. | |
| 8,463,729 B2 | 6/2013 | Achterberg | |
| 9,128,771 B1* | 9/2015 | Garg | G06F 9/5005 |
| 2003/0144975 A1* | 7/2003 | Kawamura | G06F 9/4875 |
| | | | 706/45 |
| 2006/0009987 A1* | 1/2006 | Wang | G06F 9/50 |
| | | | 705/7.13 |
| 2009/0150209 A1 | 6/2009 | Levine | |
| 2010/0205044 A1* | 8/2010 | Scheer | G06Q 10/087 |
| | | | 705/28 |
| 2011/0224816 A1* | 9/2011 | Pereira | G05B 19/41865 |
| | | | 700/100 |
| 2014/0137104 A1* | 5/2014 | Nelson | G06F 9/45558 |
| | | | 718/1 |
| 2014/0278650 A1 | 9/2014 | Bagheri et al. | |
| 2014/0278661 A1 | 9/2014 | Nielsen et al. | |
| 2014/0351819 A1* | 11/2014 | Shah | G06F 9/4887 |
| | | | 718/103 |

\* cited by examiner

2

AUTOMATIC SOLUTION TO A SCHEDULING PROBLEM

TECHNICAL FIELD

The present disclosure relates to scheduling problems in general, and to mobile workforce scheduling problems, in particular.

BACKGROUND

Mobile workforce scheduling is a computationally challenging task. Mobile workforce scheduling is a task of assigning mobile agents to perform tasks, often at remote locations, during designated time frames. For example, in case of a telecommunications company having a fleet of technicians, and a set of service calls to be handled, the scheduling problem may include the selection of which service calls, and at what order, each technician would perform.

The mobile workforce scheduling problem is often tackled by the means of generic solvers, such as Mixed Integer Linear Programming (MILP) solvers, Constraint Satisfaction Problem (CSP) solvers, or the like. Such solvers require a modeling of the mobile workforce scheduling problem into a formal framework. However, in some cases, and in particular in real life scenarios, the entire problem may be too complex for the solver to solve as is.

BRIEF SUMMARY

One exemplary embodiment of the disclosed subject matter is a method comprising: obtaining a scheduling problem comprising: a set of agents and a set of tasks to be performed by the set of agents, wherein solving the scheduling problem using an automated solver is not feasible using available predetermined resources; automatically generating a plurality of alternative scheduling problems, wherein a solution to each such alternative scheduling problem defines a solution to the scheduling problem; and determining a solution to the scheduling problem by applying the automated solver to solve, while using the available predetermined resources, an alternative problem of the plurality of alternative scheduling problems to determine a solution to the alternative problem and by mapping the solution to the alternative problem to the scheduling problem, whereby determining the solution.

Another exemplary embodiment of the disclosed subject matter is a computerized apparatus having a processor, the processor being adapted to perform the steps of: obtaining a scheduling problem comprising: a set of agents and a set of tasks to be performed by the set of agents, wherein solving the scheduling problem using an automated solver is not feasible using available predetermined resources; automatically generating a plurality of alternative scheduling problems, wherein a solution to each such alternative scheduling problem defines a solution to the scheduling problem; and determining a solution to the scheduling problem by applying the automated solver to solve, while using the available predetermined resources, an alternative problem of the plurality of alternative scheduling problems to determine a solution to the alternative problem and by mapping the solution to the alternative problem to the scheduling problem, whereby determining the solution.

Yet another exemplary embodiment of the disclosed subject matter is a computer program product comprising a non-transitory computer readable storage medium retaining program instructions, which program instructions when read by a processor, cause the processor to perform a method comprising: obtaining a scheduling problem comprising: a set of agents and a set of tasks to be performed by the set of agents, wherein solving the scheduling problem using an automated solver is not feasible using available predetermined resources; automatically generating a plurality of alternative scheduling problems, wherein a solution to each such alternative scheduling problem defines a solution to the scheduling problem; and determining a solution to the scheduling problem by applying the automated solver to solve, while using the available predetermined resources, an alternative problem of the plurality of alternative scheduling problems to determine a solution to the alternative problem and by mapping the solution to the alternative problem to the scheduling problem, whereby determining the solution.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
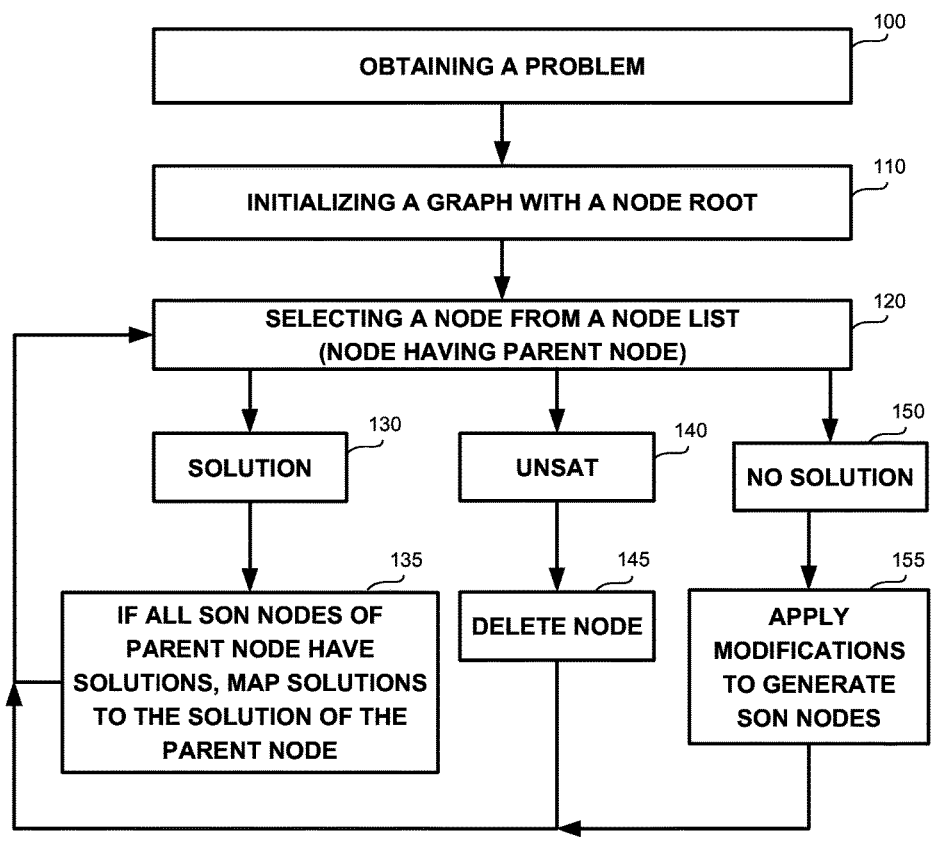
FIG. 1 shows a flowchart diagram of a method, in accordance with some exemplary embodiments of the disclosed subject matter.

One technical problem dealt with by the disclosed subject matter is to provide an automatic manner of solving a scheduling problem. While the disclosed subject matter is not limited to a mobile workforce scheduling problem, such a scheduling problem is used throughout the disclosure for ease of explanation.

A scheduling problem is a problem of scheduling tasks to agents. In some exemplary embodiments, agents may be mobile and require to arrive at the location of the task, requiring also traveling time. In some exemplary embodiments, some agents may be better than others in solving some types of tasks. In some exemplary embodiments, each task may have an assigned timeframe for starting and for ending, such as a task to be performed between 12:00-15:00. Additionally or alternatively, there may be an estimated task handling time, which may vary from agent to agent, such as based on the agent's skill, historic information regarding handling similar tasks, or the like. In some exemplary embodiments, the scheduling problem may be aimed to assign agents to each task, while maintaining the time limitations to handle each task, and while optimizing a target function, such as by minimizing a cost function, which may take into account agent's wages, cost of travel, customers' satisfaction, or the like.

In some exemplary embodiments, given a predetermined amount of resources, such as limitations on CPU time, on available memory, and on computation time, solving the scheduling problem may not be feasible. However, solving a set of sub-problems whose solution can be mapped to a solution to the scheduling problem, may be feasible.

In some exemplary embodiments, the technical problem at hand may be to generate a set of problems that can be solved and the solutions of which can be used to provide for a solution to the original scheduling problem. Approximating the original scheduling problem may provide sub-optimal solution. Manual approximation may be performed by a skilled person having information on the specific details of the scheduling problem and the automated solver being used to solve it. However, an automated heuristic to approximating the scheduling problem may be desired so as to be used by non-expert users. In particular, it may be desired to provide an automatic heuristic for approximating a scheduling problem in general, and a mobile workforce scheduling problem in particular.

One technical solution is generate a plurality of alternative scheduling problems to the original scheduling problem. The plurality of alternative scheduling problems may be an approximation of the scheduling problem. A solution to the plurality of alternative scheduling problems may be obtained, such as by applying an automated solver. The solution may be mapped to a solution from the plurality of alternative scheduling problems to the scheduling problem.

In some exemplary embodiments, the disclosed subject matter may automatically explore a space of problem modifications. The scheduling problem can be modified by one or more potential modification steps, each of which may approximate the problem. In some cases, a potential modification step may split the problem into two or more sub-problems, such as by creating disjoint subsets of agents and disjoint subsets of tasks and creating the sub-problem of satisfying the sub-problems of using one subset of agents to complete one subset of tasks. Each modification step may be parameterized and different parameters may be defined therefore, such as size of subsets, allocation function of agents or tasks into different sub-problems, or the like.

In some exemplary embodiments, finding a best modification (or a modification having a quality value above a threshold) may be an optimization problem by itself which may be solved by a systematic search in the space of problem modifications. In some exemplary embodiments, an automated solver may be used to solve the optimization problem to generate the alternative scheduling problems, which may be, in turn, fed to a solver for solving the scheduling problem itself.

In some exemplary embodiments, a collection of possible modifications implicitly defines the (possibly infinite) space of problem modifications. The optimization problem may be case as a planning problem which may be solved using an automated planning problem solver, also referred to as an automated planner. In some exemplary embodiments, the optimization problem may be described in Planning Domain Description Language (PDDL) and it may be fed to an automated planner.

Additionally or alternatively, a systematic search of the space may be performed to explore the space. The exploration may be based on Depth First Search (DFS), Breadth First Search (BFS), or any other systematic search. For ease of explanation and without loss of generality, the disclosure below focuses on DFS.

In some exemplary embodiments, DFS may be performed in the space of problem modifications, with the additional branching on attempting to solve each (modified) problem directly by the means of utilizing a solver. If a solution is found for some modification, it may be propagated back to its original problem. Once a solution is found for all immediate modifications of some problem, a solution for that problem may be generated (and propagated back to its original problem). The process may continue when a solution is found, attempting at gradually improving its value. Search branches that are found to exceed best current solution value may be pruned. In some exemplary embodiments, a node list may be maintained, initially consisting of the original problem only. At each exploration iteration, a node from the list may be selected, explored and expanded by generating all the successors based on potential modification. The successors may be added to the node list if the node is not solvable on its own.

In some exemplary embodiments, one decision point of the process is which search node to expand next. Nodes may be assigned a score value when generated, and a node with currently highest score is chosen to be expanded at each step. The expansion step then consists of generation of all successor search nodes, by applying all applicable modifications to the expanded node. In some exemplary embodiments, the process may terminate when either time threshold is reached or the list becomes empty.

In some exemplary embodiments, the output of a process as described above is a sequence of solution, heuristic pairs of increasing quality. Each heuristic is a path in the problem modifications space, corresponding to a sequence of modifications. These modifications can be further used as a heuristic scheme for further problem instances of the same domain.

In some exemplary embodiments, a graph may be constructed, where each node in the graph represents a scheduling problem and an edge represent a modification step leading from one scheduling problem to one or more alternative scheduling problems that are an approximation thereof. The graph may be explored systematically. In some exemplary embodiments, in case a problem represented by a node can be solved, it may be solved and its solution may be used, together with other solutions, to define a solution to the original problem. Additionally or alternatively, in case the problem of the node cannot be solved using the predetermined resources available (e.g., a solution is infeasible given a predetermined amount of resources available for the solver; such determination may be made after attempting to solve the problem and failing to provide a conclusion or prior thereto based on parameters of the problem itself, such as a size of sets of agents, tasks or the like), traversal through outgoing edges (or creation of such edges and son nodes) may be performed to attempt approximate the problem through one or more additional problems represented by the connected nodes. In case the problem is unsolvable, such as determining the problem is unsatisifiable, the node may be discarded and no approximation thereof may be performed. Instead, alternative sibling nodes may be considered as a means to replace the node in the approximation of its parent node. In some exemplary embodiments, information obtained from discarded nodes may be used later on, such as in cases when the node is regenerated.

In some cases, solutions from several different sets of plurality of alternative scheduling problems may be determined, each defining an alternative solution to the scheduling problem. The alternative solutions may be compared and a best solution, such as based on some evaluation metric, may be selected and used.

One technical effect of utilizing the disclosed subject matter may be producing multiple diverse solutions. Such a diverse collection of solutions may be useful in many real life scenarios.

Another technical effect may be producing quality solutions that correspond to problem modifications that otherwise would not be considered, and thus has the potential of obtaining better solutions than hand crafted approach, and without requiring human expert.

Referring now to FIG. 1 showing a flowchart diagram of a method in accordance with some exemplary embodiments of the disclosed subject matter.

In Step 100, a scheduling problem may be obtained. The problem may be obtained in a computer-readable form. The problem may be a problem that is to be solved while using a set of available predetermined resources, such as a predetermined computation time, a predetermined amount of memory, a predetermined computation power, or the like.

In Step 110, a graph may be initialized with a root node. The graph may comprise nodes and edges. The root node may represent the scheduling problem, also referred to as the original problem. In some exemplary embodiments, a node list may be maintained, indicating a set of nodes for traversal. Traversal order may be defined implicitly or explicitly by the node list, such as based on the order of the list, based on a score of each node, or the like. Initially, the list may be initialized with the root node.

In Step 120, a node may be selected from the node list. For any node other than the root node, the node may have a parent node—a node which has an edge outgoing therefrom and ingoing to the selected node. In some cases, more than a single parent may exist.

An attempt may be made to determine whether the solution represented by the node can be solved when using the predetermined available resources. In some cases, the determination may be based on an attempt to solve the problem by using a solver, such as a CSP solver, a MILP solver, or the like. Additionally or alternatively, there may be a static analysis step of analyzing the problem and estimating whether or not solving the problem is feasible in view of its size and complexity. Only in case it is estimated that solving the problem is feasible, an attempt to solve the problem may be made.

In Step 130, in case the problem represented by the node is solved and a solution is found, the solution may be utilized to map a solution to the parent node. A solution to the parent node may exist if all sons of the node that are defined by a same modification, have solutions. In such a case, the solutions of the one or more son nodes, including the selected node, may be mapped to a solution to the parent node (135). In some exemplary embodiments, the mapping may depend on the modification employed. In some exemplary embodiments, a modification may be splitting each of the set of agents and the set of tasks into two or more disjoint subsets (e.g., $T_1$ tasks to be performed by $A_1$ agents, and $T_2$ tasks to be performed by $A_2$ agents, where tasks T are $T=\cup T_i$, where agents A are $A=\cup A_i$, and where all subsets are disjoint ($\cap T_i=\emptyset$, $\cap A_i=\emptyset$). In such a case, a solution S to parent node N which is modified to son nodes $N_1 \ldots N_M$ may be a conjunction of solutions $s_1 \ldots s_M$ of nodes $N_1 \ldots N_M$ respectively. Additionally or alternatively, a modification providing an additional restriction to the original problem, such as hardening a time restriction, requiring two tasks be performed by a same agent, restricting the set of possible agents that are capable of performing a task or the like. In such a case, parent node may have exactly one son node defined based on the modification. A solution to the son node is a solution to the parent node. In some cases, in view of the additional restriction, solving the problem of the son node may be feasible while solving the problem of the parent node may be unfeasible.

In Step 140, in case it is determined the problem is unsatisfiable and no solution exists to such problem, the node may be discarded and ignored in the future (145). Such a node may be created in view of a modification which may alter a satisfiable problem into an unsatisfiable one. As an example, in case a restriction is added that all tasks are performed by a single agent, the satisfiable solution may be modified to an unsatisfiable one.

In Step 150, in case no solution is determined to the problem of the selected node, one or more alternative modification may be applied to generate one or more sets of alternative problems to the problem (155). Each set may be part of a group that a solution thereto is sufficient to determine a solution to the selected node. Each set may represent a different modification. A node may be created for each alternative problem and introduced to the graph as well as to the node list.

After exploring the selected node (130-150), additional node may be selected (120) and another iteration of the process may be performed. The process may finish upon exceeding a time limit or upon determining a solution to the root node. The solution to the root node may depend upon propagation of solutions of nodes to their parent nodes, which in turn may propagate upwards, until the solution propagates to the root node.

Figure 2:
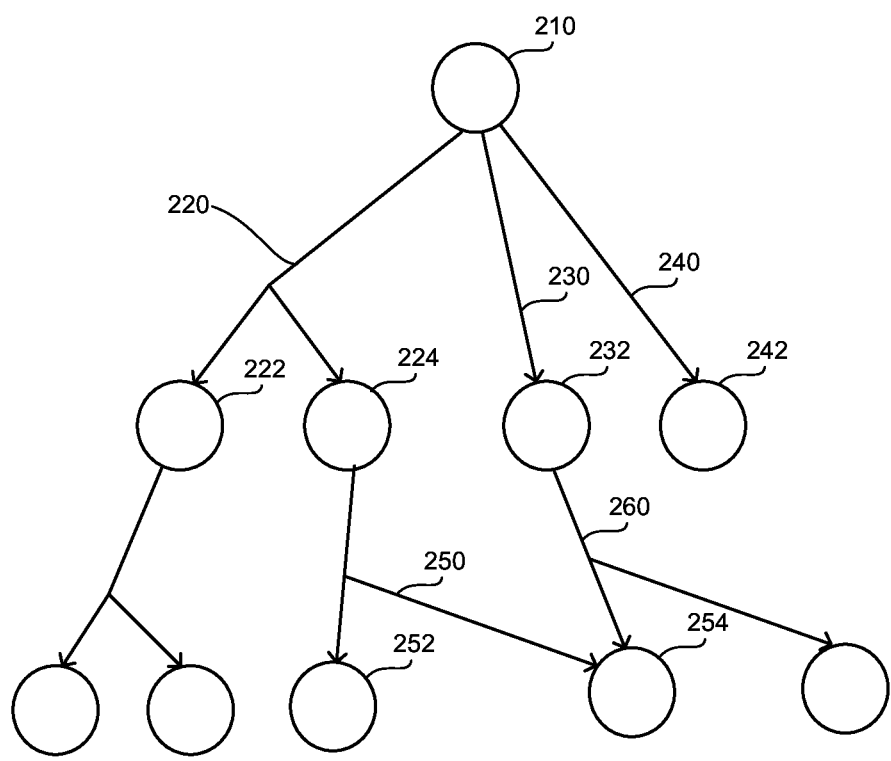
FIG. 2 shows an illustration of a modification graph, in accordance with some exemplary embodiments of the disclosed subject matter.

Referring now to FIG. 2 showing an illustration of a modification graph, in accordance with some exemplary embodiments of the disclosed subject matter.

Root Node 210 of the graph may represent the original scheduling problem. As illustrated in FIG. 2, three potential modification may be applied, each represented by an edge (220, 230, 240). Edge 220 represents a modification splitting the problem into two sub-problems, represented by Nodes 222 and 224. Edge 220 connects one parent node, also referred to as a source node (210) with two son nodes, also referred to as target nodes (222, 224). Edge 230 represents a modification to the Node 210 which approximates the problem to a single, more restricted, and potentially easier to solve, problem, represented by Node 232. Similarly, Edge 240 represents a modification of the problem of Root Node 210 to an alternative problem represented by Node 242.

Each node may also be solved by creating modifications thereof. As an example, FIG. 2 illustrates a modification to Node 224 which consists of splitting such problem into two sub-problems on its own (Nodes 252, 254 as represented by Edge 250).

In some exemplary embodiments, in case a solution is found to all son nodes of an edge, the solutions may be mapped to a solution of the parent node. In such a manner, solutions may propagate from nodes to their parent nodes until reaching the root node.

In some exemplary embodiments, nodes of the graph may have more than a s single parent. Node 254 is illustrated as being obtainable by performing the modification represented by Edge 220 followed by the modification of Edge 250 or, alternatively, by performing the modification of Edge 230 followed by the modification of Edge 260. In some exemplary embodiments, a solution to Node 254 may propagate to be used as a solution to both parent nodes.

In some exemplary embodiments, the graph may be expanded by applying additional modifications to nodes that are not yet solved. In some exemplary embodiments, when a node is examined, it may be expanded by applying all potential modifications thereof. Additionally or alternatively, the node may be expanded partially and on future iterations additional modifications may be applied.

In some exemplary embodiments, the graph may be a directed acyclic graph (DAG).

Figure 3:
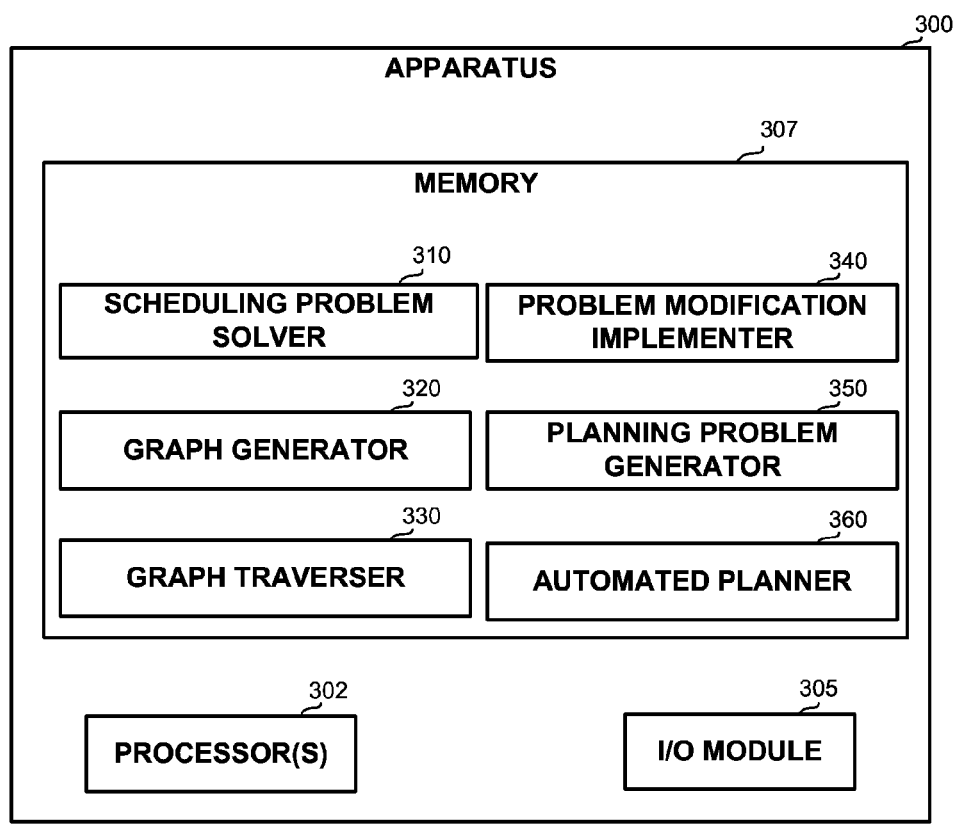
FIG. 3 shows a block diagram of an apparatus, in accordance with some exemplary embodiments of the disclosed subject matter.

Referring now to FIG. 3 showing a block diagram of an apparatus in accordance with some exemplary embodiments of the disclosed subject matter. An Apparatus 300 may be configured to determine a solution to a scheduling problem, in accordance with the disclosed subject matter.

In some exemplary embodiments, Apparatus 300 may comprise a processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) module 305. I/O Module 305 may be utilized to provide an output to and receive input from a user, such as define the problem, provide hints to modifications, review solutions, or the like.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

Scheduling Problem Solver 310 may be configured to provide a solution to a scheduling problem. In some exemplary embodiments, Solver 310 may translate the scheduling problem to a CSP, MILP or a similar formal representation and solve the problem by determining a solution to the formal representation.

Graph Generator 320 may be configured to generate a modification graph, such as depicted in FIG. 2. Graph Traverser 330 may be configured to traverse the graph. In some exemplary embodiments, Generator 320 and Traverser 330 may be combined and generation may be performed while traversing the graph. Traverser 330 may be configured to traverse a node, determine if it is solvable using the available resources. Traverse 330 may attempt at solving the problem represented by the node, such as by applying Solver 310 thereon. In case the node is solvable, Traverser 330 may propagate the solution thereto to parent nodes and attempt mapping the solutions of their son node(s) to create a solution to such parent nodes as well.

In case the problem of the node cannot be solved using the available resources, one or more modifications may be implemented on the problem of the node to determine potential sets of alternative problems. Problem Modification Implementer 340 may be utilized to implement each modification and determine one or more problems that can serve as an alternative problem to the problem of the node. In some exemplary embodiments, some modification may be implemented into an alternative problem that comprises a single problem. Other modification may be implemented into a set of sub-problems that together form the alternative problem. For each problem a node may be created and added to the graph.

Additionally or alternatively, a Planning Problem Generator 350 may be configured generate a planning problem depicting the problem of selecting desired modifications to the original problem. The planning problem may define potential modifications as the actions to be taken and the solution may be a sequence of modifications that provide for one or more alternative scheduling problems that are solvable using the predetermined available resources. Automated Planner 360 may be utilized to solve the planning problem generated by Generator 350. Planner 360 may be an automated tool configured at solving planning problems, such as defined using PDDL.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a scheduling problem comprising: a set of agents and a set of tasks to be performed by the set of agents, wherein solving the scheduling problem using an automated solver is not feasible using available predetermined resources, and wherein the scheduling problem is defined in a planning domain description language;
automatically generating a plurality of alternative scheduling problems, wherein each alternate scheduling problem is created by providing additional restrictions to the scheduling problem, wherein a solution to each such alternative scheduling problem defines a solution to the scheduling problem, and wherein the additional restrictions comprise requiring a subset of the set of tasks to be performed by a same agent within the set of agents and restricting a subset of the set of agents that are capable of performing a task in the set of tasks to a smaller subset;
determining a solution to the scheduling problem by applying the automated solver to solve, while using the available predetermined resources, an alternative problem of the plurality of alternative scheduling problems to determine a solution to the alternative problem and by mapping the solution to the alternative problem to the scheduling problem, wherein the available predetermined resources comprise predetermined computation power and predetermined computation time, and the automated solver is a mixed-integer linear programming (MILP) solver; and
sending alerts to the set of agents based on the solution to the scheduling problem.

2. The method of claim 1, wherein said automatically generating comprises:
generating a modifications graph, wherein the modifications graph comprises nodes that represent scheduling problems and edges between a source node and a one or more target nodes, each such edge represents applying a modification to a scheduling problem represented by the source node to obtain an alternative scheduling problem that is represented by the one or more target nodes; and wherein the modification graph is generated by initializing the modification graph to include a root node representing the scheduling problem and by iteratively applying one or more predetermined modifications on nodes of the modifications graph that do not have associated outgoing edges to generate the plurality of alternative scheduling problems, wherein for each generated alternative scheduling problem, a node is added to the modifications graph.

3. The method of claim 2, wherein said determining a solution comprises searching the modifications graph to determine a set of one or more alternative scheduling problems that are solvable by the solver using the available predetermined resources, solutions of the set of one or more alternative scheduling problems are mapped to the solution to the scheduling problem.

4. The method of claim 2, wherein the one or more predetermined modifications comprises:
   a first modification that introduces a restriction to an original scheduling problem, whereby a solution of a modified scheduling problem is the solution to the original scheduling problem; and
   a second modification that splits an original scheduling problem into two or more sub-problems, wherein each of the two or more sub-problems comprises a disjoint subset of the set of agents and a disjoint subset of the set of tasks, wherein each agent of the set of agents is comprised by exactly one disjoint subset of the set of agents, wherein each task of the set of tasks is comprised by exactly one disjoint subset of the set of tasks, whereby unifying two or more solutions to the sub-problems provides the solution to the original scheduling problem.

5. The method of claim 1, wherein said generating comprises:
   determining a planning problem, wherein the planning problem comprises an initial state representing the scheduling problem and a description of a set of possible actions, wherein each possible action corresponding to a modification of a problem to a modified problem; and
   utilizing an automated planner to determine a solution to the planning problem, the solution comprises a sequence of actions to modify the scheduling problem into the plurality of alternative scheduling problems, each of which can be solved independently by the automated solver using the available predetermined resources.

6. The method of claim 1, wherein the scheduling problem is a mobile workforce scheduling problem, wherein each agent of the set of agents is a mobile agent.

7. A computerized apparatus having a processor, the processor being adapted to perform the steps of:
   obtaining a scheduling problem comprising: a set of agents and a set of tasks to be performed by the set of agents, wherein solving the scheduling problem using an automated solver is not feasible using available predetermined resources, and wherein the scheduling problem is defined in a planning domain description language;
   automatically generating a plurality of alternative scheduling problems, wherein each alternate scheduling problem is created by providing additional restrictions to the scheduling problem, wherein a solution to each such alternative scheduling problem defines a solution to the scheduling problem, and wherein the additional restrictions comprise requiring a subset of the set of tasks to be performed by a same agent within the set of agents and restricting a subset of the set of agents that are capable of performing a task in the set of tasks to a smaller subset;
   determining a solution to the scheduling problem by applying the automated solver to solve, while using the available predetermined resources, an alternative problem of the plurality of alternative scheduling problems to determine a solution to the alternative problem and by mapping the solution to the alternative problem to the scheduling problem, wherein the available predetermined resources comprise predetermined computation power and predetermined computation time, and the automated solver is a mixed-integer linear programming (MILP) solver; and
   sending alerts to the set of agents based on the solution to the scheduling problem.

8. The computerized apparatus of claim 7, wherein said automatically generating comprises:
   generating a modifications graph, wherein the modifications graph comprises nodes that represent scheduling problems and edges between a source node and a one or more target nodes, each such edge represents applying a modification to a scheduling problem represented by the source node to obtain an alternative scheduling problem that is represented by the one or more target nodes; and
   wherein the modification graph is generated by initializing the modification graph to include a root node representing the scheduling problem and by iteratively applying one or more predetermined modifications on nodes of the modifications graph that do not have associated outgoing edges to generate the plurality of alternative scheduling problems, wherein for each generated alternative scheduling problem, a node is added to the modifications graph.

9. The computerized apparatus of claim 8, wherein said determining a solution comprises searching the modifications graph to determine a set of one or more alternative scheduling problems that are solvable by the solver using the available predetermined resources, solutions of the set of one or more alternative scheduling problems are mapped to the solution to the scheduling problem.

10. The computerized apparatus of claim 8, wherein the one or more predetermined modifications comprises:
    a first modification that introduces a restriction to an original scheduling problem, whereby a solution of a modified scheduling problem is the solution to the original scheduling problem; and
    a second modification that splits an original scheduling problem into two or more sub-problems, wherein each of the two or more sub-problems comprises a disjoint subset of the set of agents and a disjoint subset of the set of tasks, wherein each agent of the set of agents is comprised by exactly one disjoint subset of the set of agents, wherein each task of the set of tasks is comprised by exactly one disjoint subset of the set of tasks, whereby unifying two or more solutions to the sub-problems provides the solution to the original scheduling problem.

11. The computerized apparatus of claim 7, wherein said generating comprises:
    determining a planning problem, wherein the planning problem comprises an initial state representing the scheduling problem and a description of a set of possible actions, wherein each possible action corresponding to a modification of a problem to a modified problem; and utilizing an automated planner to determine a solution to the planning problem, the solution comprises a sequence of actions to modify the scheduling problem into the plurality of alternative scheduling problems, each of which can be solved independently by the automated solver using the available predetermined resources.

12. The computerized apparatus of claim 7, wherein the scheduling problem is a mobile workforce scheduling problem, wherein each agent of the set of agents is a mobile agent.

13. A computer program product comprising a non-transitory computer readable storage medium retaining program instructions, which program instructions when read by a processor, cause the processor to perform a method comprising:

obtaining a scheduling problem comprising: a set of agents and a set of tasks to be performed by the set of agents, wherein solving the scheduling problem using an automated solver is not feasible using available predetermined resources, and wherein the scheduling problem is defined in a planning domain description language;

automatically generating a plurality of alternative scheduling problems, wherein each alternate scheduling problem is created by providing additional restrictions to the scheduling problem, wherein a solution to each such alternative scheduling problem defines a solution to the scheduling problem, and wherein the additional restrictions comprise requiring a subset of the set of tasks to be performed by a same agent within the set of agents and restricting a subset of the set of agents that are capable of performing a task in the set of tasks to a smaller subset;

determining a solution to the scheduling problem by applying the automated solver to solve, while using the available predetermined resources, an alternative problem of the plurality of alternative scheduling problems to determine a solution to the alternative problem and by mapping the solution to the alternative problem to the scheduling problem, wherein the available predetermined resources comprise predetermined computation power and predetermined computation time, and the automated solver is a mixed-integer linear programming (MILP) solver; and sending alerts to the set of agents based on the solution to the scheduling problem.

* * * * *